United States Patent [19]

Takeuchi et al.

[11] 3,898,565

[45] Aug. 5, 1975

[54] MAGNETIC WAVE COMMUNICATION SYSTEM

[75] Inventors: Shinjiro Takeuchi; Satoshi Ichioka, both of Toda; Tadashi Inoue, Tokyo, all of Japan

[73] Assignee: Mishima Kosan Co., Ltd., Kitakyushu, Japan

[22] Filed: Oct. 18, 1973

[21] Appl. No.: 407,627

Related U.S. Application Data

[63] Continuation-in-part of Ser. No. 200,687, Nov. 22, 1971, abandoned.

[30] Foreign Application Priority Data

Mar. 5, 1971 Japan ................................ 46-11711

[52] U.S. Cl. ...................... 325/28; 178/43; 179/82; 325/373; 340/174 PW; 343/788

[51] Int. Cl. ........................ H04b 5/00; H04b 13/02

[58] Field of Search ............. 325/28, 365, 373, 376, 325/363, 67; 178/43; 179/82; 343/788; 332/51 R, 51 H; 340/174 PM, 174 PW

[56] References Cited

UNITED STATES PATENTS

| | | | |
|---|---|---|---|
| 3,043,916 | 7/1962 | Sneath | 179/82 |
| 3,239,754 | 3/1966 | Odom, Jr. et al. | 340/174 PW |
| 3,421,075 | 1/1969 | Belson | 340/174 PW |
| 3,809,825 | 5/1974 | Schaad et al. | 179/82 |

*Primary Examiner*—Robert L. Griffin
*Assistant Examiner*—Marc E. Bookbinder
*Attorney, Agent, or Firm*—Wenderoth, Lind & Ponack

[57] ABSTRACT

A receiver for a magnetic wave communication system comprising antenna means, a signal treating circuit, an amplifier and a reproducing means. The antenna means includes a casing and an antenna member consisting of a core conductor, a magnetic thin film, and a coil. The signal treating circuit comprises an impedance means and a diode detector. The antenna means receives the transmitted audio frequency magnetic field signal and converts the magnetic field signal to a current corresponding with the audio frequency magnetic field signal.

1 Claim, 9 Drawing Figures

MAGNETIC WAVE COMMUNICATION SYSTEM

CROSS-REFERENCE TO RELATED APPLICATION

This application is a continuation-in-part of our copending application Ser. No. 200,687 filed Nov. 22, 1971 and now abandoned.

BACKGROUND OF THE INVENTION

1. Field of the Invention

The invention relates to a receiver for a magnetic wave communication system having a magnetic sensing antenna.

2. Description of the Prior Art

As a communication system, wire or radio communication systems have widely been used hereinbefore. In the former case, however, it is terribly inconvenient to use it on a temporary basis, due to problems such as administration, supervision or the like, in addition to the difficulty of wiring work. In the latter case, defects of the former case can be compensated, but the wireless communication system uses space as a main propagation medium, so that communication between the air, the earth and the water each is very difficult.

Accordingly, there has been a need for a system with which communication between the air and the earth or the water can precisely and reliably be carried out in the various industrial works.

SUMMARY OF THE INVENTION

It is an object of the present invention, therefore, to provide a receiver for a system for communicating between propagation media such as the air, the earth and the water.

A further object of the invention is to provide a receiver for a magnetic wave communication system having a magnetic field signal transmitter and a magnetic field signal receiver.

Another object of the invention is to provide an improved magnetic sensing antenna for the audio frequency magnetic field signal receiver.

Briefly, the above objects are accomplished in a typical embodiment of the present invention by the provision of a receiver for a magnetic wave communication system having an audio frequency magnetic field signal transmitter and receiver.

According to the invention, a receiver for use in a magnetic wave communication system comprises an antenna means consisting of an orthogonal type magnetic sensing antenna provided with an inductor coil to prevent deterioration of sensitivity for converting an incoming audio frequency magnetic field to an electric signal and a casing to accommodate the antenna; an excitation power source connected to a conductor to excite a magnetic thin film coated on the conductor, the magnetic thin film and the conductor being formed with the inductor coil; a signal treating circuit connected to the coil of the antenna means for detecting an amplitude difference between positive and negative asymmetrical amplitudes of the electric signal; and a control circuit including an inverted feedback circuit to transfer the detected currents which are output signals of the signal treating circuit into the coil of the antenna means through a resistor and a speaker for converting the detected current into audible signals, so that communication between heterogeneous propagation media, for instance, the air and the earth or the water, can precisely be carried out.

BRIEF DESCRIPTION OF THE DRAWINGS

The specific nature and the advantages of the system according to the present invention will become clearly evident from the following detailed description of a typical embodiment taken in conjunction with the accompanying drawings, in which.

DESCRIPTION OF THE PREFERRED EMBODIMENTS

Figure 1:
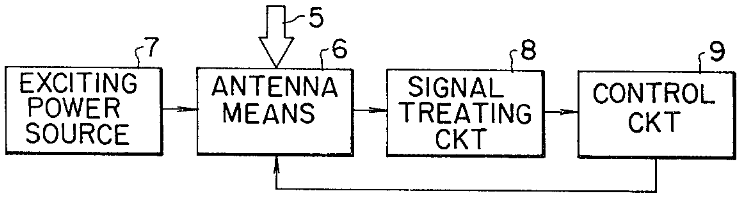
FIG. 1 is a fundamental constructional view of an audio frequency magnetic field signal receiver according to the present invention.

First referring to FIG. 1, a receiver for a magnetic wave communication system is shown. The audio frequency magnetic field signal receiver consists of an antenna means for converting an audio frequency magnetic field signal 5 into an electrical signal by means of magnetic sensing antenna 61, an excitation power source 7 for exciting the magnetic thin film of the magnetic sensing antenna in the antenna means 6, a signal treating circuit 8 for treating the converted signal taken out of said magnetic sensing antenna 6, and a control circuit 9 having an inverted feedback function to compensate the audio frequency magnetic field incoming to the magnetic sensing antenna and an indicating function corresponding to said input signal derived from the deviation between a detection converting signal and a reference signal.

The construction of the magnetic field signal receiver is outlined in the fundamental constructional views of FIG. 1 and will be explained hereinafter in detail with reference to the other figures in the case.

Figure 3:
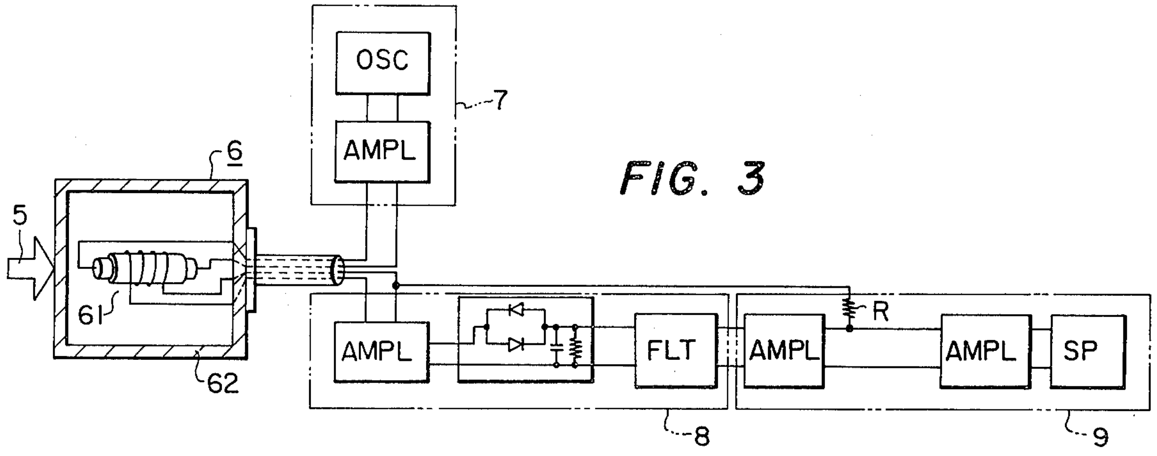
FIG. 3 is a detailed constructional view of one embodiment of the receiver according to the present invention.
Figure 4:
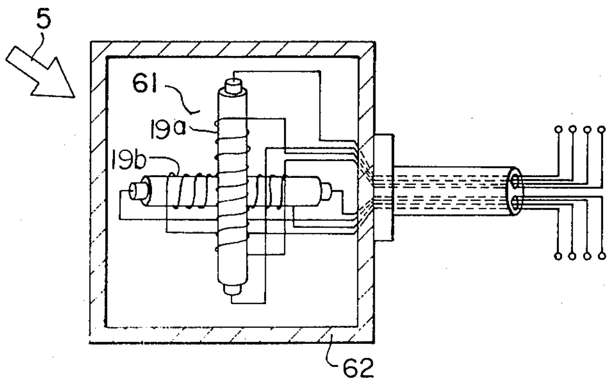
FIG. 4 is a constructional view of another embodiment of the receiver according to the invention.

FIGS. 3 and 4 show embodiments of the magnetic field signal receiver according to the invention.

As shown in FIG. 3, the antenna means 6 consists of a casing 62 and a magnetic sensing antenna 61 for converting an incoming audio frequency magnetic field 5 into an electric signal. The signal treating circuit 8 comprises an amplifier for amplifying the electric signal, a peak value detecting circuit having two diodes, and a filter for eliminating noise components. Control circuit 9 consists of an amplifier for amplifying detected current of the signal treating circuit, an inverted feedback circuit to direct the amplified and detected current into the coil of the magnetic sensing antenna through a resistor R, and a speaker SP for converting the detected current into audible signals.

In the embodiments shown in FIGS. 3 and 4, the excitation power source 7 may be an oscillator for exciting a magnetic thin film of the magnetic sensing antenna 61 and an amplifier for amplifying the output of the oscillator.

Figure 2:
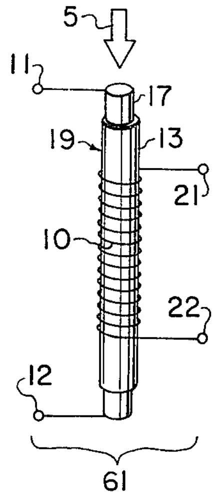
FIG. 2 is a constructional view of a magnetic sensing antenna for receiving the audio frequency magnetic field signal.

A basic magnetic sensing antenna, as shown in FIG. 2, may be made of an orthogonal type magnetic sensor, with an orthogonal relationship between the direction of the incoming audio frequency magnetic field 5 and the direction of a magnetic field used to excite the magnetic thin film of the magnetic sensing antenna.

FIG. 2 is a fundamental constructional view of the magnetic sensing element 61 of the orthogonal type magnetic sensor, and when the excitation power source is connected thereto and a current flows between terminals 11 and 12, a magnetic field generated by the excitation current becomes parallel to a winding direction of an output coil.

The orthogonal magnetic field type magnetic sensing antenna is constructed as shown, and serves to convert an output voltage between terminals 21 and 22 of the coil into an asymmetrical amplitude voltage (i.e., said electric signal) corresponding to the audio frequency magnetic field. In FIG. 2, 11 and 12 are terminals for applying an excitation current, 17 is a conductor having a magnetic thin film 13 coated on its surface (highly permeable material, for instance permalloy, is preferable) and forming a magnetic wire 19.

The magnetic thin film 13 and the conductor 17 can be multi-layered, and their mutually positional relationship is not limited within the range where the function of the orthogonal type magnetic sensing antenna in a flux gate system is satisfied.

Further, when providing an excitation means in the above multilayers, terminals, such as the terminals 11 and 12, can be connected at upper and lower end portions in series or in parallel.

The manufacture of a magnetic sensing antenna having a multilayered this film applied with magnetic wire 19, as described above, can be carried out by directly or indirectly coating a magnetic material around the periphery of one or more bare wires or insulated core conductors, by coating the periphery of a bare wire with an insulator, or by covering it with a conductor, magnetic material, an insulating material or the like after coating it with a conductor, by means of any available means, such as electrodeposition or vapor deposition, and lamination of cylindrical materials.

However, there is no limitation in anisotropy, i.e. existence of anisotropy, of the magnetic thin film 13, and an open magnetic path and closed magnetic path for easy magnetization direction and hard magnetization direction and axial and peripheral directions of the conductor.

The magnetic sensing antenna can also be formed in the axial direction by a single wire or a double wire in the form of a straight line, a curved line, a folded line, a circular line, a spiral line, a cut-circular line, a U-shaped line, a screw-shaped line, a multilayer volute-shaped line, or by a conductor, a magnetic thin film, an insulator in a single layer, or a multilayer suitably selected with each layer in the shape of a rod, square, column, flat plate, strip, or the like.

By connecting the magnetic sensing antenna composed as described above to the excitation power source 7, a converted signal having asymmetrical amplitude sensitively influenced by the audio frequency magnetic field appears on the terminals 21 and 22.

FIG. 4 is an explanatory view of the subject invention wherein two orthogonal type magnetic sensing antennas are used. In this embodiment, the magnetic sensing antennas consisting of two magnetic wires 19*a* and 19*b* are arranged on the orthogonal axes so as to form a two directional antenna element. Antennas may also be formed consisting of three magnetic wires which may be mutually orthogonally arranged so as to form an omni-directional antenna element.

Examples of a circuit construction of the orthogonal type magnetic sensing antenna and a signal treating circuit is shown in FIGS. 5 and 6 and will be explained below.

Figures 5A, 5B, 6A, 6B, 6C:
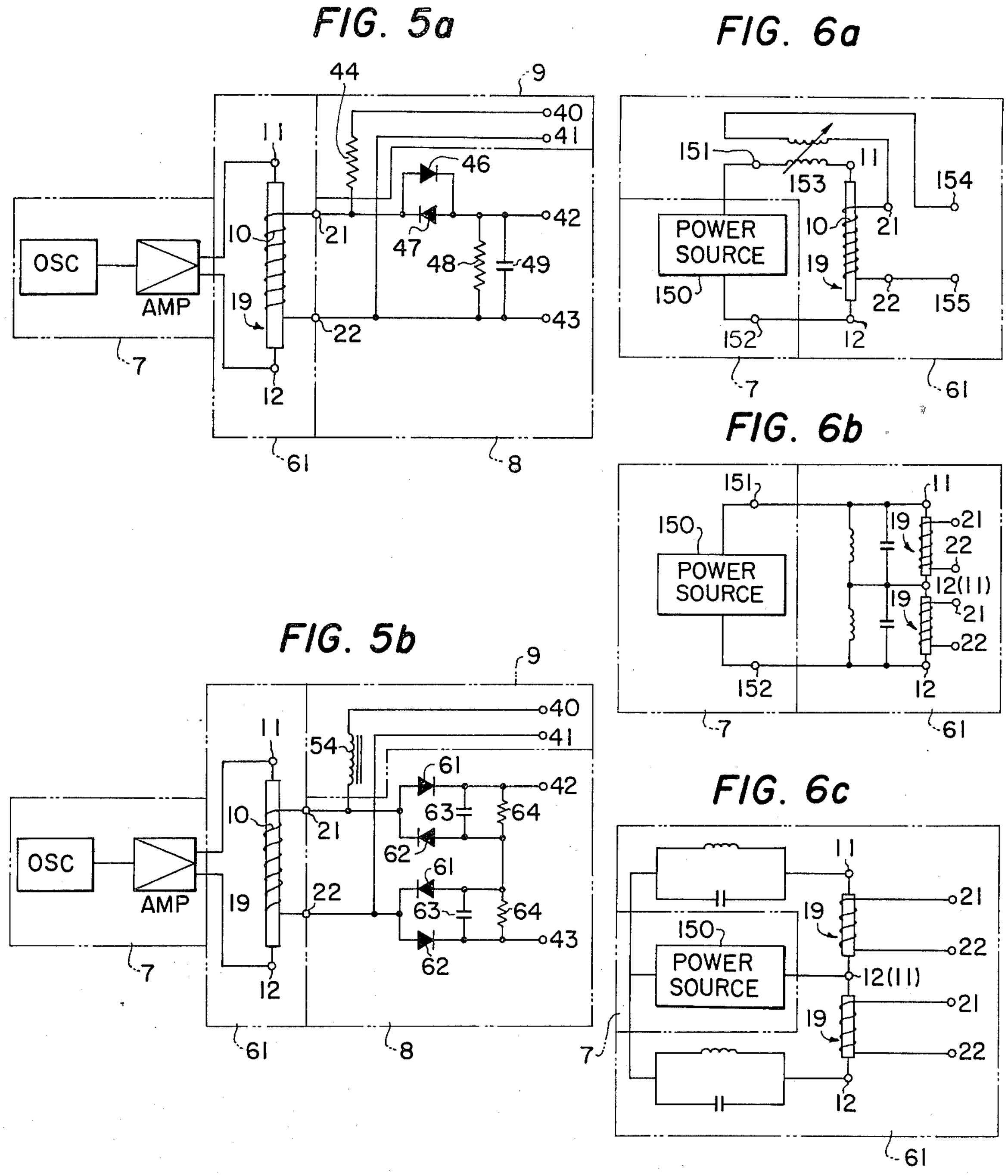
FIGS. 5*a* and 5*b* are circuit diagrams showing a detailed embodiment of the signal treating circuit.
FIGS. 6*a* – 6*c* are circuit diagrams showing an embodiment of a compensation method.

FIGS. 5*a* and 5*b* are examples of the signal treating circuit 8, in which signal detection may be carried out for detecting amplitude difference between positive and negative asymmetrical amplitudes. FIG. 5*a* shows a signal treating circuit 8 comprising a detection circuit having two diodes to detect the amplitude difference between positive and negative asymmetrical amplitudes of the converted signal. FIG. 5*b* shows a signal treating circuit 8 having two diodes and a part of a control circuit with an inductor instead of resistor.

The antenna element used in each example is shown as the single converting element depicted in FIG. 2, but use can be made of two or three element orthogonal type magnetic sensing antennas, such as shown in FIG. 4. It is necessary to determine the polarity of the coil 10 of the antenna element used in each example in accordance with the purpose of use of the present device. Further, the practical values to be obtained by each element of the resistor and coil range from zero to infinity, i.e. there may be a short-circuiting portion or an open-circuiting portion in each element.

In each example, 40 and 41 are control terminals, which are used for applying a negative feedback current corresponding to the audio frequency magnetic field signal in order to compensate for the control command audio frequency magnetic field signal, i.e. input signal, of the control circuit 9.

FIGS. 6*a*–6*c* are explanatory views of a compensation means for improving the characteristics of a magnetic sensing antenna and relating to the power source side of the circuit. FIG. 6*a* is an explanatory view of a means for fundamental wave inductive compensation from the power source, in which reference numeral 150 is a power source or a part of the excitation power source 7 (refer to FIG. 1). Reference numerals 151 and 152 are output terminals of the power source, and 153 is a mutually inductive coil for compensating the fundamental wave induction. Numerals 154 and 155 are output terminals, wherefrom the compensated output is derived. In the case that the coil 10 is unidirectionally wound on the magnetic thin film of the magnetic sensing antenna, an induced voltage due to the excitation current is superimposed on the signal converted from the audio frequency magnetic field signal at the terminals 21 and 22, resulting in a decrease of the sensitivity. To prevent such deterioration of sensitivity, a mutually inductive coil is arranged between the excitation circuit and the output circuit and is compensated by freely adjusting a coupling coefficient.

In FIGS. 6*b* and 6*c* circuits are shown for matching the characteristics of a plurality of single converting elements by compensating the amplitude value, the phase, the waveform or like characteristics of the excitation current in order to improve the sensitivity by using the capacitors and inductors. Moreover, the compensating means shown in FIGS. 6*a*–6*c* can be applied to each of the circuits shown in FIGS. 5*a* and 5*b*. Further, in FIGS. 5*a* and 5*b* and 6*a* – 6*c*, if the output voltage of the antenna element is low, it can be amplified by inserting an amplifying circuit thereinto.

As is apparent from the above explanation, according to the system of the present invention, the magnetic field signal is detected by the magnetic sensing antenna so that communications between the air, the earth and the water become possible without the difficulty which exists in a conventional radio communication system when such communication is tried between different media. Therefore, the present invention can be widely utilized in not only a special field, but also over a wide range of activities.

We claim:

1. A receiver for use in a magnetic wave communication system comprising:

an antenna means for converting an incoming audio frequency magnetic field to an electric signal having positive and negative asymmetrical amplitudes, said antenna means comprised of an orthogonal type magnetic sensing antenna having an inductor coil to prevent deterioration of sensitivity in the signal and a casing, said antenna being housed in said casing;

a conductor having a magnetic thin film coated thereon, said conductor being formed on said inductor coil;

an excitation power source connected to said conductor to excite said thin film;

a signal treating means coupled to said inductor coil for detecting an amplitude difference between said positive and negative asymmetrical amplitudes of the electric signal to produce a detected output signal; and a control circuit means coupled to said signal treating means having a resistor and a speaker, and including said resistor operatively coupled between said speaker, and said antenna means whereby said speaker converts said detected output signal to an audible output signal.

* * * * *